United States Patent
Corghi

(10) Patent No.: US 7,395,849 B2
(45) Date of Patent: Jul. 8, 2008

(54) METHOD AND DEVICE FOR DISMOUNTING SELF-SUPPORTING TYRES

(75) Inventor: Remo Corghi, Correggio (IT)

(73) Assignee: Corghi S.P.A., Reggio Emila (IT)

( * ) Notice: Subject to any disclaimer, the term of this patent is extended or adjusted under 35 U.S.C. 154(b) by 0 days.

(21) Appl. No.: 11/478,701

(22) Filed: Jul. 3, 2006

(65) Prior Publication Data
US 2007/0006975 A1    Jan. 11, 2007

(30) Foreign Application Priority Data
Jul. 11, 2005   (IT)   ............... RE2005A0079

(51) Int. Cl.
*B60C 25/135* (2006.01)
(52) U.S. Cl. ............... 157/1.24; 157/1.2; 157/1.28
(58) Field of Classification Search ......... 157/1, 157/1.1, 1.17, 1.2, 1.22, 1.24, 1.26, 1.28
See application file for complete search history.

(56) References Cited

U.S. PATENT DOCUMENTS

| | | | | |
|---|---|---|---|---|
| 3,771,581 A | * | 11/1973 | Johnson | 157/1.22 |
| 4,846,239 A | * | 7/1989 | Heller et al. | 157/1.3 |
| 6,062,289 A | * | 5/2000 | Cunningham et al. | 157/16 |
| 6,182,736 B1 | * | 2/2001 | Cunningham et al. | 157/1.24 |
| 6,237,666 B1 | * | 5/2001 | Magnani | 157/1.3 |
| 6,324,753 B1 | * | 12/2001 | Naruse | 29/821 |
| 6,408,921 B1 | * | 6/2002 | Bonacini | 157/1.24 |
| 6,527,032 B2 | * | 3/2003 | Corghi | 157/1.28 |
| 6,619,362 B2 | * | 9/2003 | Corghi | 157/1.24 |
| 6,629,554 B2 | * | 10/2003 | Mimura | 157/1.24 |
| 6,823,922 B2 | * | 11/2004 | Gonzaga | 157/1.3 |
| 6,863,110 B1 | | 3/2005 | Cunningham | |
| 6,880,605 B2 | * | 4/2005 | Corghi | 157/1.24 |

(Continued)

FOREIGN PATENT DOCUMENTS

EP    1 314 584 A1    5/2003

(Continued)

*Primary Examiner*—D. S Meislin
(74) *Attorney, Agent, or Firm*—Browdy and Neimark

(57) ABSTRACT

A method for dismounting self-supporting tires (1) from the relative rim (2), said self-supporting tires comprising an outer cover (10) that contains a rigid auxiliary ring (16) provided with two flexible sidewalls (18, 19). Said method comprises the operating steps of: lifting a first bead (14) of the outer cover (10) away from the rim (2) in a usual manner, so as to make a first sidewall (18) of the auxiliary ring (16) accessible; inserting a dismounting tool (5) between the elastic edge of said first sidewall (18) of the auxiliary ring (16) and the edge of the rim (2); moving said dismounting tool (5), so as to grip the elastic edge of said first sidewall (18) and to turn a part thereof towards the outside; pushing said turned part of the first sidewall (18) outwards, making it slide in contact with the dismounting tool (5), until it passes over the edge of the rim (2); rotating the auxiliary ring (16) according to the central axis (A) of the rim (2), so that the entire elastic edge of the first sidewall (18) interacts with the dismounting tool (5), and is thus completely lifted away from the rim (2); lifting both the second sidewall (19) of the auxiliary ring (16) and the second bead (15) of the outer cover (10) away from the rim (2) in the usual manner.

10 Claims, 5 Drawing Sheets

U.S. PATENT DOCUMENTS

| | | | |
|---|---|---|---|
| 6,991,018 B2 * | 1/2006 | Kliskey | 157/1 |
| 7,048,026 B2 * | 5/2006 | Bonacini | 157/1.28 |
| 7,089,987 B2 * | 8/2006 | Gonzaga | 157/14 |
| 7,108,036 B2 * | 9/2006 | Spaggiari | 157/1.24 |
| 7,128,119 B2 * | 10/2006 | Corghi | 157/1.22 |
| 2002/0017368 A1 * | 2/2002 | Corghi | 157/1.24 |
| 2002/0162633 A1 | 11/2002 | Mimura | |
| 2004/0129388 A1 * | 7/2004 | Brazil | 157/1.3 |

FOREIGN PATENT DOCUMENTS

| | | |
|---|---|---|
| EP | 1 398 184 A1 | 3/2004 |
| EP | 1 459 913 A2 | 9/2004 |
| EP | 1 593 533 A2 | 11/2005 |
| FR | 556 352 | 7/1923 |

* cited by examiner

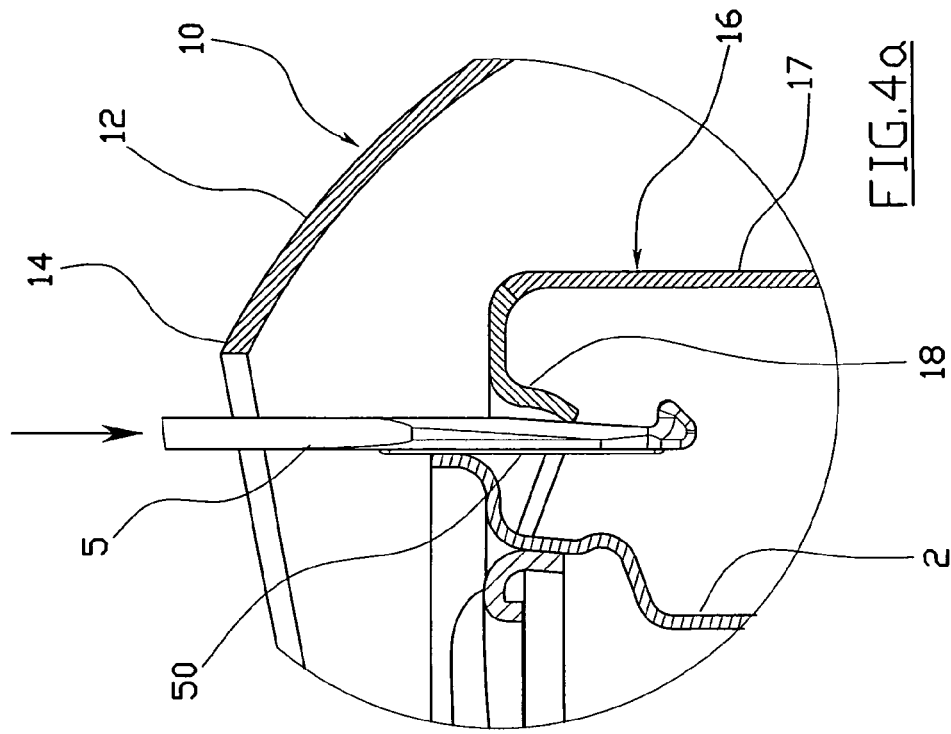
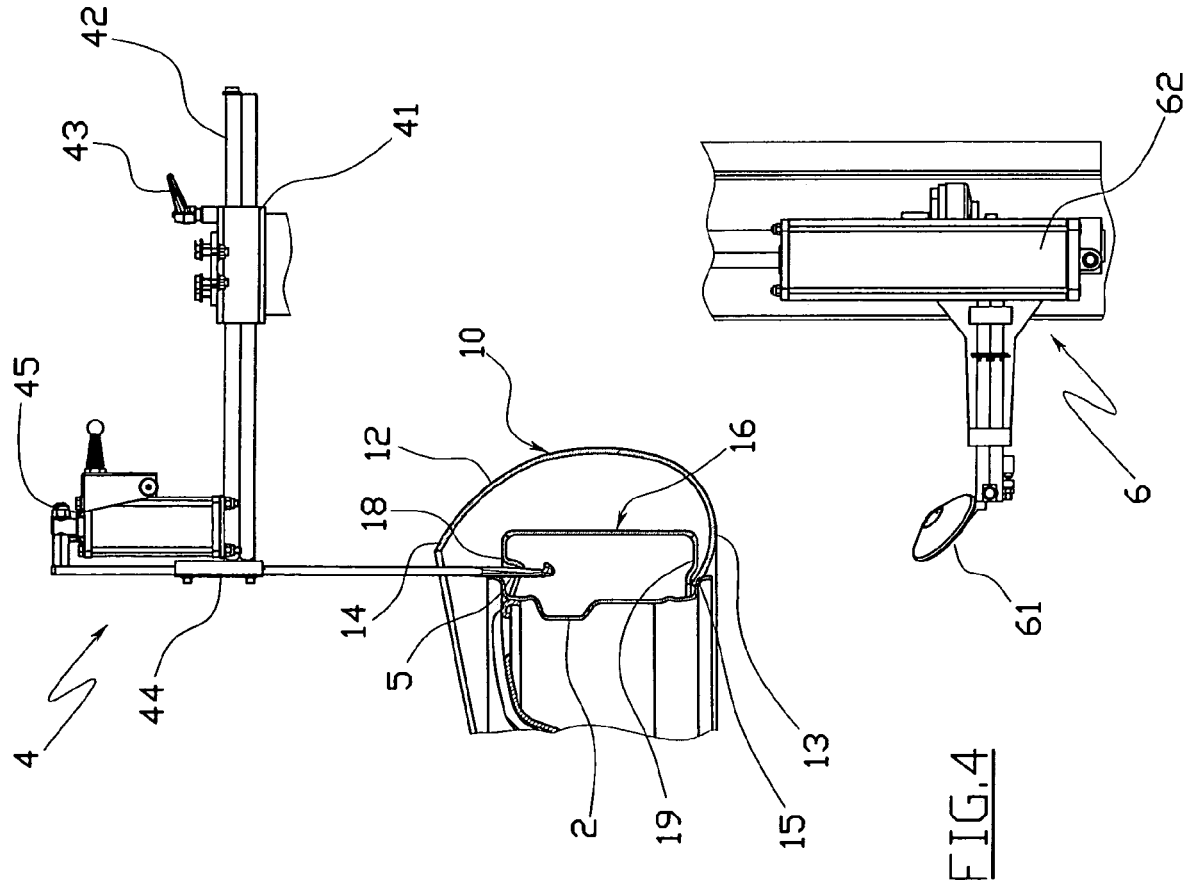

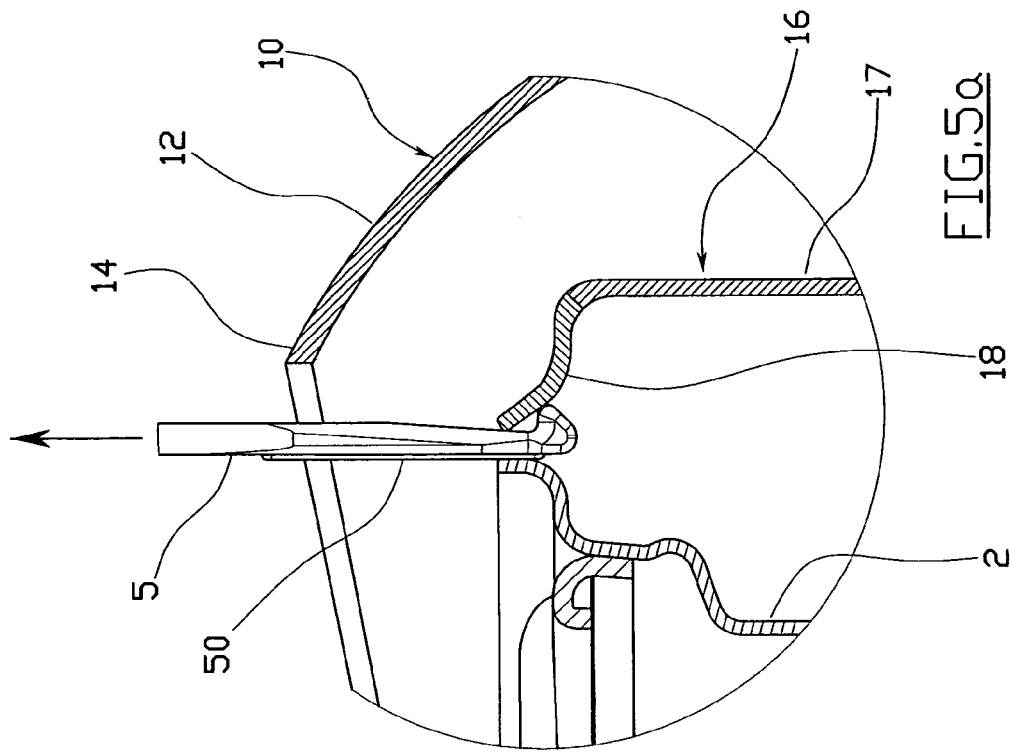
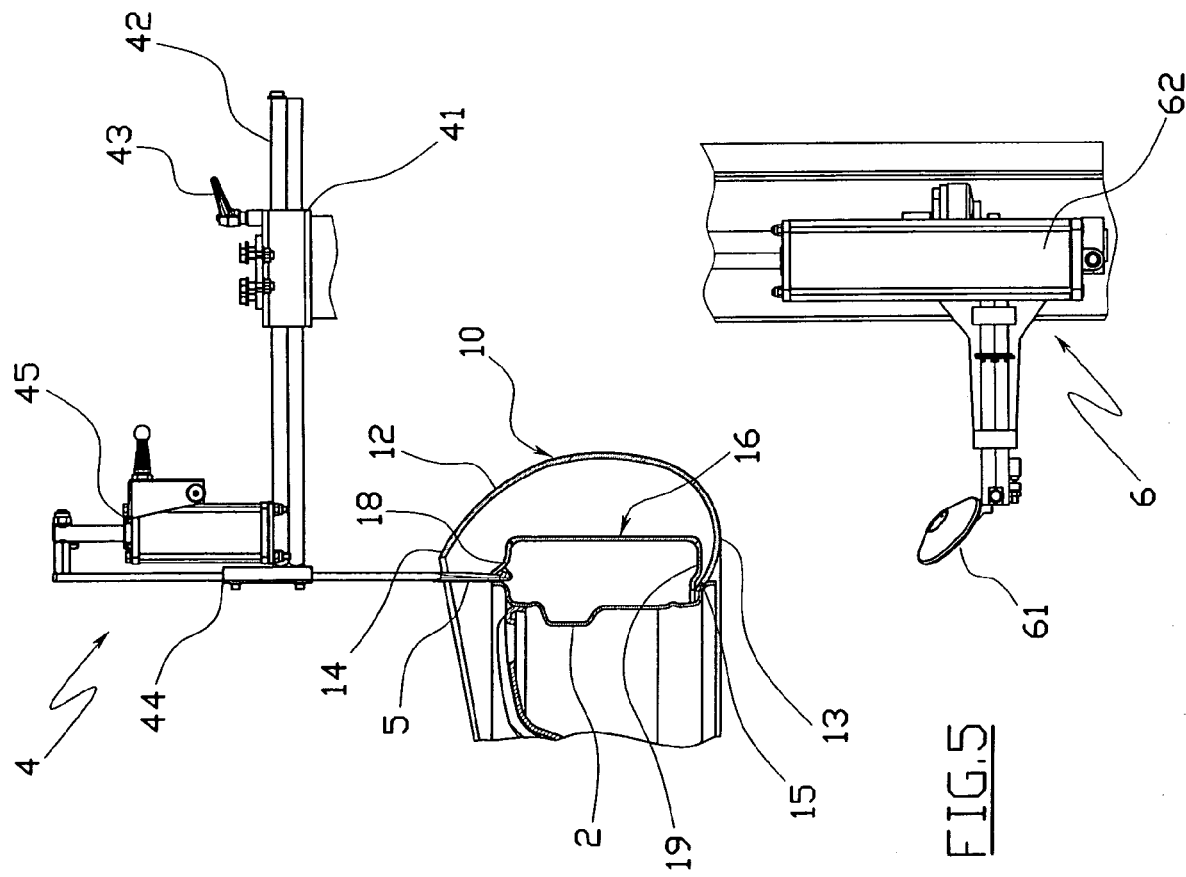

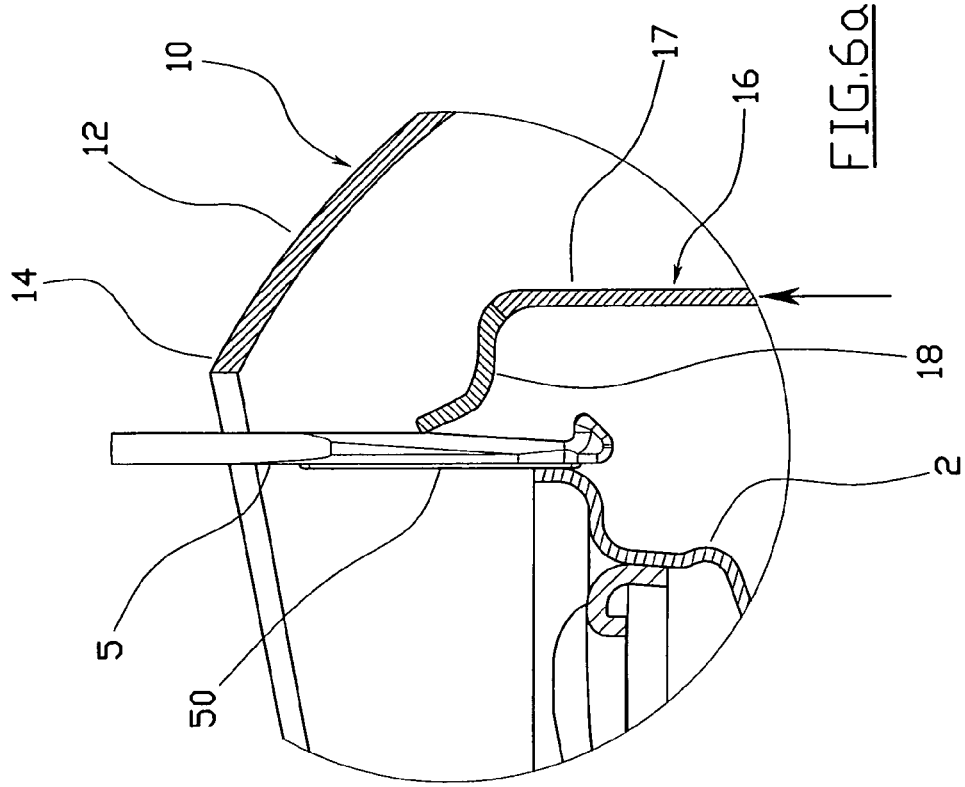
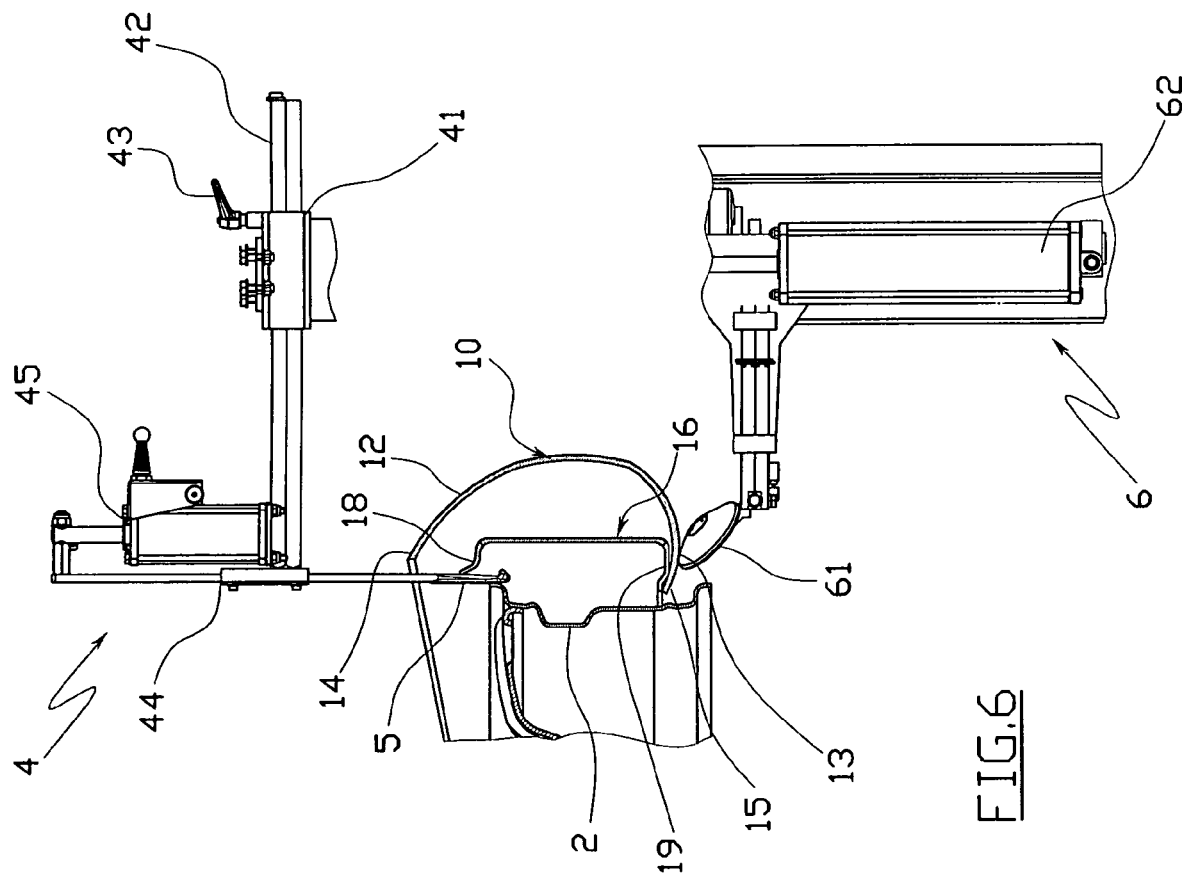

METHOD AND DEVICE FOR DISMOUNTING SELF-SUPPORTING TYRES

BACKGROUND OF THE INVENTION

1. Technical Field of the Invention

The present invention refers to a method for dismounting self-supporting tyres, and to a device for carrying out such a method.

2. Prior Art

As known, research in the field of vehicle tyres has for a long time focussed upon making tyres that can effectively work even when flat, for example following a puncture, so as not to require their immediate replacement.

Therefore, in recent years the biggest manufacturing firms have proposed many different types of tyres capable of performing this requirement.

A type of tyre that offers substantial advantages is a self-supporting tyre that comprises a usual rubber outer cover, suitable for providing a tread for resting on the ground, which contains a rigid auxiliary ring that supports the weight of the vehicle, when said outer cover is flat.

Said auxiliary ring is generally formed from an outer band of metal material, typically steel, with which two rubber sidewalls are associated that are sufficiently rigid as not to bend unacceptably when subjected to the weight of the vehicle, but flexible enough to mount the ring onto the rim.

As is obvious, the extensive use of this type of self-supporting tyre has created a pressing need to solve the technical problem of dismounting it from the relative rim, so as to allow it to be replaced or repaired.

OBJECT AND SUMMARY OF THE INVENTION

The purpose of the present invention is that of solving the aforementioned technical problem, with a simple, rational and low-cost solution.

Such a purpose is accomplished through a method for dismounting self-supporting tyres of the type outlined in the preamble, which comprises the operating steps of:

a) lifting a first bead of the outer cover away from the rim in the usual manner, so as to make a first sidewall of the auxiliary ring accessible;

b) inserting a dismounting tool between the elastic edge of said first sidewall of the auxiliary ring and the edge of the rim;

c) moving said dismounting tool, so as to grip the elastic edge of said first sidewall and to turn a part thereof towards the outside;

d) pushing said turned part of the first sidewall outwards, making it slide in contact with the dismounting tool, until it passes over the edge of the rim;

e) rotating the auxiliary ring according to the axis of the rim, so that the entire elastic edge of the first sidewall interacts with the dismounting tool, and is thus completely lifted away from the rim;

f) lifting both the second sidewall of the auxiliary ring and the second bead of the outer cover away from the rim in the usual manner.

Thanks to this solution it is possible to dismount the self-supporting tyre very simply and quickly, without running the risk of damaging it or of damaging the relative rim.

The invention also provides a device for dismounting self-supporting tyres, intended to be associated with any known tyre-dismounting machine, which is equipped with rotary support means for the rim complete with tyre.

Said device comprises an operating head that carries a dismounting tool, shaped like a harpoon, mobile according to a direction parallel to the axis of the rim and according to a direction perpendicular to it, which is associated with a jack for carrying out: an insertion stroke, during which it is suitable for being positioned between the elastic edge of a sidewall of the auxiliary ring and the edge of the rim; and a withdrawal stroke in the opposite direction, during which it is suitable for gripping the elastic edge of said sidewall and for turning a part thereof towards the outside.

BRIEF DESCRIPTION OF THE DRAWINGS

Further characteristics and advantages of the invention shall become clear from reading the following description provided as an example and not for limiting purposes, with the help of the figures illustrated in the attached tables, in which:

FIGS. 2 to 6 show a detail of FIG. 1 during as many steps of the method;

FIGS. 4a, 5a and 6a show an enlarged detail of FIGS. 4, 5 and 6 respectively.

The method object of the present invention allows self-supporting tyres 1 to be dismounted from the relative rim 2.

DETAILED DESCRIPTION OF THE PREFERRED EMBODIMENT(S) OF THE INVENTION

Figure 1:
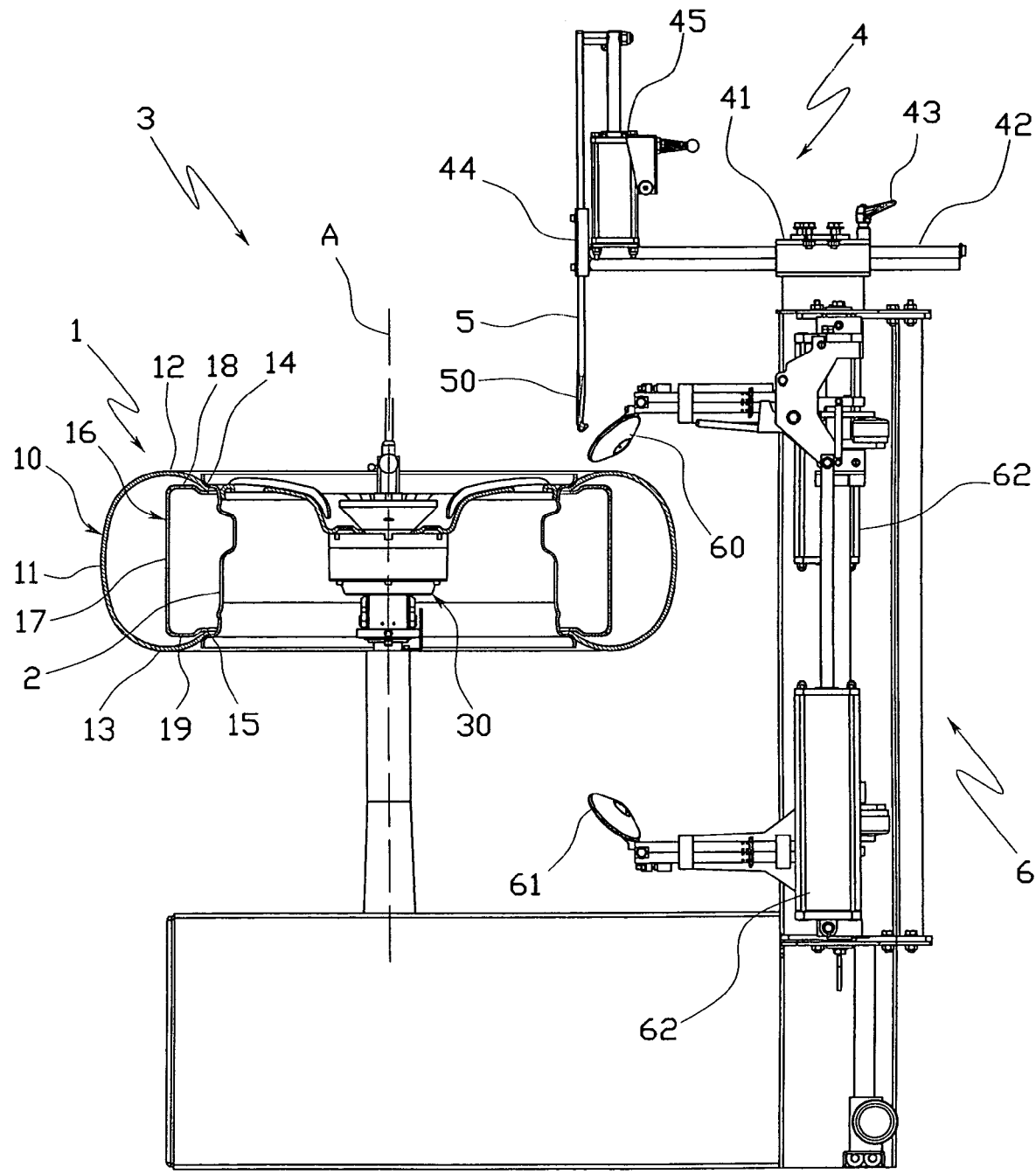
FIG. 1 is a side view of a tyre-dismounting machine equipped to carry out the method object of the invention, which is shown without the common turret tool.

As shown in FIG. 1, said self-supporting tyres 1 comprise a usual outer cover 10, which is equipped with a tread 11 and with two sidewalls 12 and 13, individually provided with a bead 14 and 15, suitable for coupling with a respective edge of the rim 2.

Inside the outer cover 10 a rigid auxiliary ring 16 is contained comprising a band of steel 17 with which two rubber elastic sidewalls 18 and 19 are associated, which are sufficiently rigid as not to bend excessively under the weight of the vehicle, should the outer cover 10 go flat.

The method in object can be carried out through a usual tyre-dismounting machine 3 provided with means 30 suitable for supporting the rim 2 and for making it rotate according to its central axis A, which is suitably equipped with a special device for dismounting self-supporting tyres 1.

Said dismounting device comprises an operating head 4 provided with a prismatic shaft 42 perpendicular to the axis A of the rim 2, and orientated in the radial direction with respect to said axis A, said prismatic shaft 42 being slidably received inside a hollow support 41, where it can be locked in a suitable position through a C-clamp 43.

The end of the prismatic shaft 42 facing the way of the rim 2 carries a dismounting tool 5, which is in turn received inside a guide block 44, and is suitable for sliding in a direction parallel to the axis A of the rim 2, actuated by a jack 45 fixedly connected to the prismatic shaft 42.

In particular, the end of said dismounting tool 5 facing the self-supporting tyre 1 has a hook which is substantially harpoon-shaped, with the corners rounded, and it is provided on the back with a plate 50 made from plastic. As shown in FIG. 4a, 5a the hook is designed to engage a sidewall 18 of rigid auxiliary ring 16.

The tyre-dismounting machine 3 also comprises a usual turret tool (not shown since it is per se known), and an equally usual debeading device 6 provided with two interfacing debeading discs 60 and 61 arranged symmetrically on opposite sides with respect to the rim 2.

Each of said debeading discs 60 and 61 is actuated by a respective jack 62 to move in a direction parallel to the axis A of the rim 2, so as to act on a sidewall, 12 and 13 respectively, of the outer cover 10 of the tyre 1.

The first step of the method in object foresees withdrawing a first bead 14 of the outer cover 10 from the rim 2 in a usual manner, so as to make the adjacent elastic sidewall 18 of the auxiliary ring 16 accessible.

Figure 2:
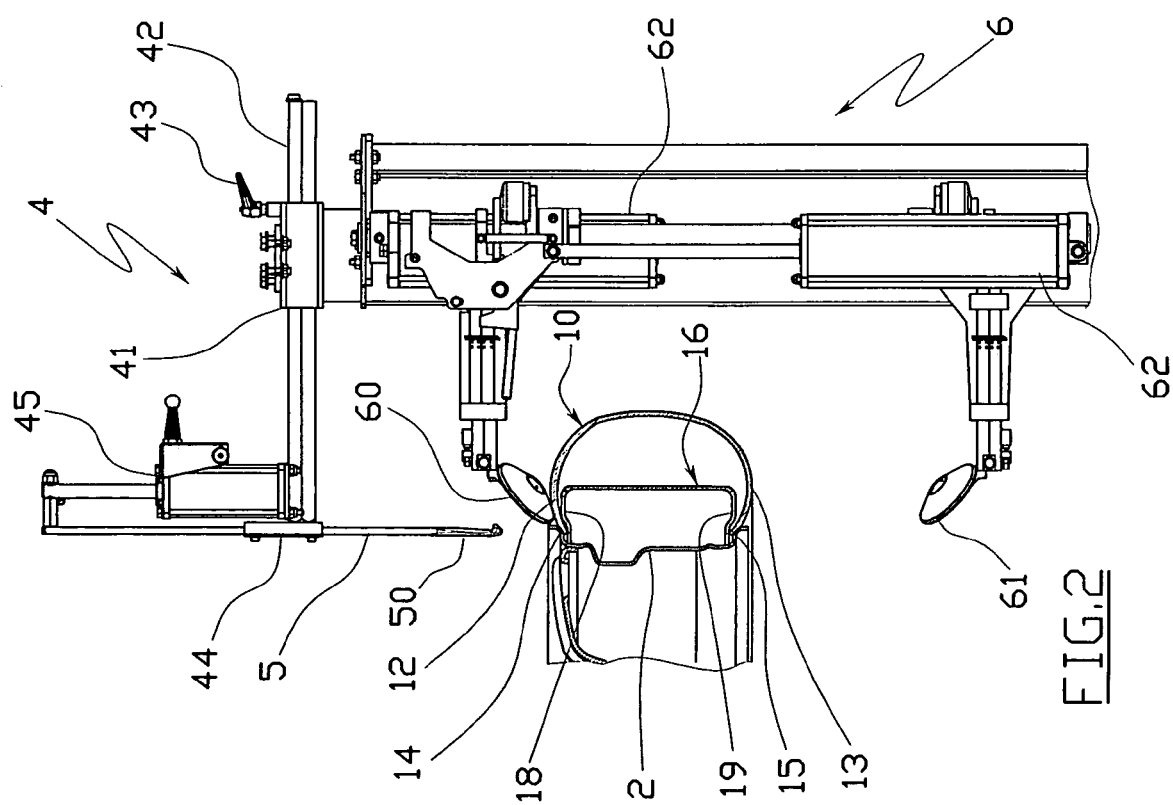

As illustrated in FIG. 2, after having stably coupled the rim 2 with the rotary support means 30 of the tyre-dismounting machine 3, the debeading disc 60 is taken into contact on the sidewall 12 of the outer cover 10, near to the edge of the rim 2.

Then the rim 2 is made to rotate according to its central axis A to take the outer cover 10 with it, and the debeading disc 60 is actuated to push said sidewall 12 inwards, causing the detachment of the bead 14 from the edge of the rim 2.

Figure 3:
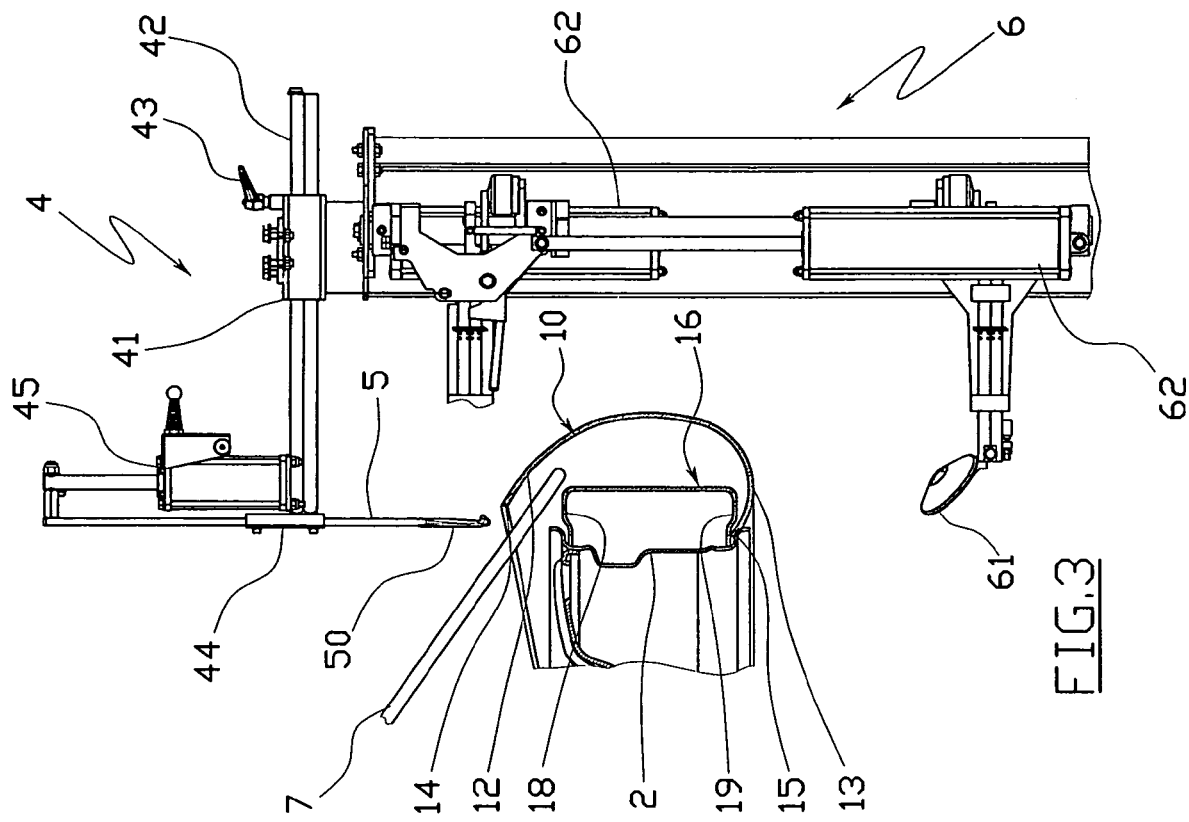

As illustrated in FIG. 3, the detached bead 14 is then gripped with a bead-lifting lever 7, and taken outside of the edge of the rim 2 resting upon the turret tool of the tyre-dismounting machine 3 (not shown), which takes care of lifting it away completely from the rim 2 itself, thanks to a further rotation thereof.

The second step of the method foresees inserting the aforementioned dismounting tool 5 between the edge of the elastic sidewall 18 of the auxiliary ring 16, and the edge of the rim 2.

To carry out this second step, the position of said prismatic shaft 42 of the operating head 4 is preliminarily adjusted, so as to arrange the dismounting tool 5 in a working position, in which it is located outside of the auxiliary ring 16 near to the sidewall 18, with the back substantially rested upon the edge of the rim 2.

At this point, the jack 45 is activated that actuates the dismounting tool 5 to move in an insertion direction parallel to the axis of the rim 2, sliding in contact with the edge thereof, so as to press against the sidewall 18 of the auxiliary ring 16.

As illustrated in FIGS. 4 and 4a, said pressure causes a progressive bending of the elastic sidewall 18 inwards, until a through space is provided that finally allows the dismounting tool 5 to be inserted between the edge of the sidewall 18 itself and the edge of the rim 2.

In particular, said insertion step is made easier by the tapered shape of the dismounting tool 5 that, thanks to the rounded corners, does not damage the auxiliary ring 16; however, if necessary, it is foreseen to make insertion easier through the bead-lifting lever 7.

The third step of the method, illustrated in FIGS. 5 and 5a, foresees that the dismounting tool 5 subsequently is actuated by the jack 45 to move in a withdrawal direction, opposite the previous insertion direction, so that its hook end engages the edge of the elastic sidewall 18 and turns a part thereof outwards.

The fourth step of the method then foresees pushing said turned part of the elastic sidewall 18 outwards, making it slide in contact with the dismounting tool 5 that remains still, until it passes over the edge of the rim 2.

As illustrated in FIGS. 6 and 6a, in order to carry out such a step the debeading disc 61 is taken into contact with the sidewall 13 of the outer cover 10, and is actuated to move in a direction parallel to the axis of the rim 2, so as to move the outer cover 10 itself towards the dismounting tool 5 and with it the auxiliary ring 16, causing the turned part of the sidewall 18 to slide.

Having reached such a configuration, the method foresees that the support means 30 rotate the rim 2 about its own axis A, so that the auxiliary ring 16 rotates fixedly connected to it and the entire edge of its elastic sidewall 18 is engaged to interact with the dismounting tool 5.

In this way, made easier by the thrust that the debeading disc 61 continues to exert, the edge of the sidewall 18 gradually comes out from the upper edge of the rim 2, until it is lifted completely away from it.

It should be highlighted that during the aforementioned insertion/withdrawal steps of the dismounting tool 5, as well as during this last rotation step, the back of the dismounting tool 5 slides in contact with the edge of the rim 2, which is protected from possible damage thanks to the plastic plate 50 with which the dismounting tool 5 is equipped.

Once the withdrawal step of the elastic sidewall 18 of the auxiliary ring 16 is complete, it is finally easy to lift both the second sidewall 19 of the auxiliary ring 16, and the second bead 15 of the cover 10 away from the rim 2 in the usual manner, with the help of the bead-lifting lever 7 and the turret tool of the tyre-dismounting machine 3.

It should be observed that before each of the described steps of the method, it is preferable to take care of the lubrication, through suitable grease, of the touching parts of the self-supporting tyre 1 and of the mechanical dismounting members, to make it easier to carry out the steps themselves and to avoid the risk of damage.

Of course, numerous practical-application modifications can be made to the invention in object, without for this reason departing from the scope of the inventive idea as claimed below.

The invention claimed is:

1. Method for dismounting self-supporting tyres (1) from the relative rim (2), said self-supporting tyres comprising an outer cover (10) that contains a rigid auxiliary ring (16) provided with two flexible sidewalls (18, 19), characterised in that it comprises the operating steps of:
   a) lifting a first bead (14) of the outer cover (10) away from the rim (2), so as to make a first sidewall (18) of the auxiliary ring (16) accessible;
   b) inserting a dismounting tool (5) between an elastic edge of said first sidewall (18) of the auxiliary ring (16) and an edge of the rim (2);
   c) moving said dismounting tool (5), so as to grip the elastic edge of said first sidewall (18) and to turn a part thereof away from said rim (2);
   d) pushing said turned part of the first sidewall (18) outwards, making it slide in contact with the dismounting tool (5), until it passes over the edge of the rim (2);
   e) rotating the auxiliary ring (16) about the central axis (A) of the rim (2), so that all of the elastic edge of the first sidewall (18) interacts with the dismounting tool (5), and is thus completely lifted away from the rim (2);
   f) lifting both the second sidewall (19) of the auxiliary ring (16) and the second bead (15) of the outer cover (10) away from the rim (2).

2. Method according to claim 1, characterised in that said dismounting tool (5) has a hook to grip the elastic edges of the sidewall (18) of the rigid auxiliary ring (16).

3. Method according to claim 1, wherein after inserting the dismounting tool between the elastic edge and the edge of the rim, the dismounting tool (5) is pressed on the first sidewall (18) of the auxiliary ring (16) according to a predetermined insertion direction, so as to bend said first sidewall (18) inwards and to provide a space that allows the dismounting tool (5) itself to pass.

4. Method according to claim 3, characterised in that said insertion direction is parallel to the central axis (A) of the rim (2).

5. Method according to claim 3, characterised in that during said step b) the dismounting tool (5) slides in contact with the edge of the rim (2).

6. Method according to claim 3, wherein after said dismounting tool has tuned part of said first sidewall away from the rim, said dismounting tool (5) is moved in a withdrawal direction opposite to said insertion direction.

7. Method according to claim 1, wherein after said turned part passes over the edge of the rim, a thrust on a sidewall (13) of the outer cover (10) is exerted adjacent to a second sidewall (19) of the auxiliary ring (16).

8. Method according to claim 7, characterised in that said thrust is exerted while the auxiliary ring (16) is rotated about the central axis.

9. Method according to claim 7, characterised in that said thrust is exerted by a thrusting element (61) that is positioned in contact with said sidewall (13) of the outer cover (10), and that is actuated by a jack (62) to move in a direction parallel to the axis (A) of the rim (2).

10. Tyre-dismounting machine for dismounting self-supporting tyres (1), said self-supporting tyres (1) comprising an outer cover (10) that contains a rigid auxiliary ring (16) engaged to two flexible sidewalls (17,18), the machine comprising;
- a rotary support for a tyre engaged on a rim (2), having an axis (A),
- an operating head (4) carrying a dismounting tool (5), provided with a hook, said tool (4) movable in a direction parallel to the central axis (A) of the rim (2), and in a direction perpendicular to the central axis;
- a debeading device (6) provided with at least one debeading disc arranged in order to act on the cover (10),
- said dismounting tool (5) being associated with a jack (45) to carry out an insertion stroke, during which the tool is positioned between an elastic edge of a sidewall (18) of the auxiliary ring (16) and an edge of the rim (2), and a withdrawal stroke in the opposite direction, during which the elastic edge of said sidewall (18) is engaged by the hook;
- wherein at least one of said debeading discs (61) exerts a thrust on a portion of the outer cover (10) of the tyre (1) to move said outer cover (10) and said auxiliary ring (16) in a direction parallel to said axis of the rim (2) and towards the dismounting tool (5), causing a part of the sidewall (18) to slide on said tool (5).

* * * * *